(12) United States Patent
Lee et al.

(10) Patent No.: US 9,779,732 B2
(45) Date of Patent: Oct. 3, 2017

(54) METHOD AND ELECTRONIC DEVICE FOR VOICE RECOGNITION

(71) Applicant: Samsung Electronics Co., Ltd., Gyeonggi-do (KR)

(72) Inventors: Tae-Jin Lee, Gyeonggi-do (KR); Sang-Hoon Lee, Gyeonggi-do (KR); Subhojit Chakladar, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/946,021

(22) Filed: Nov. 19, 2015

(65) Prior Publication Data
US 2016/0148615 A1    May 26, 2016

(30) Foreign Application Priority Data
Nov. 26, 2014    (KR) ........................ 10-2014-0166478

(51) Int. Cl.
*G10L 15/22* (2006.01)
*G06F 11/30* (2006.01)
*G06F 3/16* (2006.01)
*G06F 1/32* (2006.01)
*G10L 15/08* (2006.01)

(52) U.S. Cl.
CPC .............. *G10L 15/22* (2013.01); *G06F 1/324* (2013.01); *G06F 1/3215* (2013.01); *G06F 1/3231* (2013.01); *G06F 1/3265* (2013.01); *G06F 1/3293* (2013.01); *G06F 3/167* (2013.01); *G10L 2015/088* (2013.01); *G10L 2015/223* (2013.01)

(58) Field of Classification Search
CPC .............. G10L 15/22; G10L 2015/088; G06F 1/3234–1/3246
See application file for complete search history.

(56) References Cited

U.S. PATENT DOCUMENTS

| 5,758,132 | A | 5/1998 | Str.ang.hlin | |
|---|---|---|---|---|
| 9,275,637 | B1* | 3/2016 | Salvador | ................. G10L 15/01 |
| 9,478,234 | B1* | 10/2016 | Nandy | ..................... G10L 15/30 |
| 2012/0304231 | A1 | 11/2012 | Anderson et al. | |

(Continued)

FOREIGN PATENT DOCUMENTS

| JP | 09-212192 | 8/1997 |
|---|---|---|
| JP | 2005-017932 | 1/2005 |

(Continued)

OTHER PUBLICATIONS

International Search Report dated Feb. 24, 2016 issued in counterpart application No. PCT/KR2015/012063, 10 pages.

(Continued)

*Primary Examiner* — Matthew Baker
(74) *Attorney, Agent, or Firm* — The Farrell Law Firm, P.C.

(57) ABSTRACT

Disclosed are a method and electronic device for voice recognition. The voice recognition method includes recognizing, in a first processor using low power mode, a voice signal inputted through a microphone, entering an active state and performing voice recording in a second processor if the recognized voice signal is a previously set keyword, and performing voice recognition in the second processor if the end of a voice input is determined during the voice recording.

20 Claims, 7 Drawing Sheets

(56) References Cited

U.S. PATENT DOCUMENTS

| | | | |
|---|---|---|---|
| 2013/0129114 A1* | 5/2013 | Lesso | H03L 7/08 381/98 |
| 2013/0132095 A1* | 5/2013 | Murthi | G06F 1/3234 704/275 |
| 2013/0158997 A1* | 6/2013 | Natarajan | G10L 15/08 704/240 |
| 2013/0223635 A1 | 8/2013 | Singer et al. | |
| 2013/0225238 A1* | 8/2013 | He | G06F 1/3234 455/558 |
| 2013/0339028 A1 | 12/2013 | Rosner et al. | |
| 2014/0112111 A1* | 4/2014 | Zhu | H04W 52/0251 368/250 |
| 2014/0122078 A1 | 5/2014 | Joshi et al. | |
| 2014/0222436 A1* | 8/2014 | Binder | G06F 3/167 704/275 |
| 2014/0244269 A1 | 8/2014 | Tokutake | |
| 2014/0244273 A1* | 8/2014 | Laroche | G06F 1/3206 704/275 |
| 2014/0257813 A1* | 9/2014 | Mortensen | G10L 15/02 704/251 |
| 2014/0278443 A1* | 9/2014 | Gunn | G06F 3/0488 704/275 |
| 2014/0281628 A1 | 9/2014 | Nigam et al. | |
| 2014/0309996 A1* | 10/2014 | Zhang | G10L 21/16 704/246 |
| 2014/0358552 A1* | 12/2014 | Xu | G06F 1/3234 704/275 |
| 2015/0106085 A1* | 4/2015 | Lindahl | G10L 15/32 704/231 |

FOREIGN PATENT DOCUMENTS

| | | |
|---|---|---|
| KR | 1020120066561 | 6/2012 |
| KR | 1020130001726 | 1/2013 |

OTHER PUBLICATIONS

European Search Report dated Mar. 31, 2016 issued in counterpart application No. 15195699.2-1901, 7 pages.

European Decision to Grant dated Jan. 9, 2017 issued in counterpart application No. 15195699.2-1901, 7 pages.

* cited by examiner

Mute Time Setting Table(500)

| Keyword | Application | Mute Time |
|---|---|---|
| Keyword #1 (510) | Application #1-1 | 0.5 sec |
| | Application #1-2 | 0.6 sec |
| | Application #1-3 | 0.5 sec |
| | - - | - - |
| Keyword #2 (520) | Application #2-1 | 1.0 sec |
| | Application #2-2 | 1.2 sec |
| | Application #2-3 | 1.4 sec |
| | Application #2-4 | 1.2 sec |
| | - - | - - |
| - - | - - | - - |

FIG.5

METHOD AND ELECTRONIC DEVICE FOR VOICE RECOGNITION

PRIORITY

This application claims priority under 35 U.S.C. §119(a) to a Korean Patent Application filed on Nov. 26, 2014 in the Korean Intellectual Property Office and assigned Serial number 10-2014-0166478, the entire disclosure of which is incorporated herein by reference.

BACKGROUND OF THE INVENTION

1. Field of the Invention

The present invention relates to a method and electronic device for voice recognition.

2. Description of the Related Art

Electronic devices such as smartphones and tablet Personal Computers (PCs) are being widely used. Among other capabilities, the electronic device can recognize a voice signal inputted by a user through a microphone, display a text corresponding to the voice signal, and perform various functions.

Even when sleep mode is activated by turning Off a display such as a Liquid Crystal Display (LCD) for the purpose of power saving, the electronic device can recognize the voice signal inputted by the user through the microphone, and can determine whether the voice signal is a previously-set keyword.

If the user's voice signal is the previously set keyword, the electronic device can release the sleep mode and concurrently activate an On-state of the display, and thereafter, perform a voice recognition operation of recognizing, as a command or text, a voice signal inputted by the user through the microphone.

The voice recognition operation can be performed through data communication between a server providing real-time voice recognition service through a network and the electronic device. However, conventional methods of voice recognition have been inaccurate, causing great inconvenience to users. Accordingly, there is a need in the art for an efficient solution to increase the accuracy of voice recognition in an electronic device.

SUMMARY OF THE INVENTION

Accordingly, the present invention has been made to address at least the problems and/or disadvantages described above and to provide at least the advantages described below.

Accordingly, an aspect of the present invention is to provide a method for voice recognition for enabling electronic devices to accurately recognize a user voice signal inputted through a microphone, and an electronic device for performing this method.

Another aspect of the present invention is to provide a method for voice recognition that prevents, when an electronic device recognizes a user voice signal inputted through a microphone in a sleep mode, the influence of ambient noise interfering with voice recognition, thereby increasing the accuracy of the voice recognition, and an electronic device for performing this method.

According to an aspect of the present invention, a method for voice recognition in an electronic device includes recognizing, in a first processor using a clock in a low power mode of the electronic device, a voice signal inputted through a microphone, entering, if the recognized voice signal is a previously set keyword, an active state and performing voice recording of the voice signal in a second processor, and performing voice recognition in the second processor if it is determined that an end of a voice input is reached during the voice recording, wherein, after determining that the end of the voice input is reached, a clock of the first processor is changed to a higher frequency clock.

According to an aspect of the present invention, an electronic device includes a microphone that receives an input of a voice signal, a first processor that signal-processes the voice signal, and a second processor that recognizes the voice signal, wherein the first processor recognizes, using a clock in a sleep mode of the electronic device, the voice signal inputted through the microphone, wherein if the voice signal recognized by the first processor is a previously set keyword, the second processor enters an active state from an idle state and performs a voice recording, and wherein if it is determined that an end of a voice input is reached during the voice recording, the second processor changes a clock of the first processor to a higher frequency clock.

According to an aspect of the present invention, disclosed is a non-transitory computer-readable storage medium having recorded thereon a program for performing a method for voice recognition in an electronic device, the method including recognizing, in a first processor using a clock in a low power mode of the electronic device, a voice signal inputted through a microphone, entering, if the recognized voice signal is a previously set keyword, an active state and performing voice recording of the voice signal in a second processor, and performing voice recognition in the second processor if it is determined that an end of a voice input is reached during the voice recording, wherein, after determining that the end of the voice input is reached, a clock of the first processor is changed to a higher frequency clock.

BRIEF DESCRIPTION OF THE DRAWINGS

The above and other aspects, features and advantages of the present invention will become more apparent from the following detailed description, when taken in conjunction with the accompanying drawings in which:

FIG. 5 illustrates a mute time-setting table according to embodiments of the present invention;

DETAILED DESCRIPTION OF EMBODIMENTS OF THE INVENTION

Embodiments of the present invention will be described below with reference to the accompanying drawings. In describing the present invention, well-known functions or constructions are not described in detail for the sake of clarity and conciseness.

Figure 1:
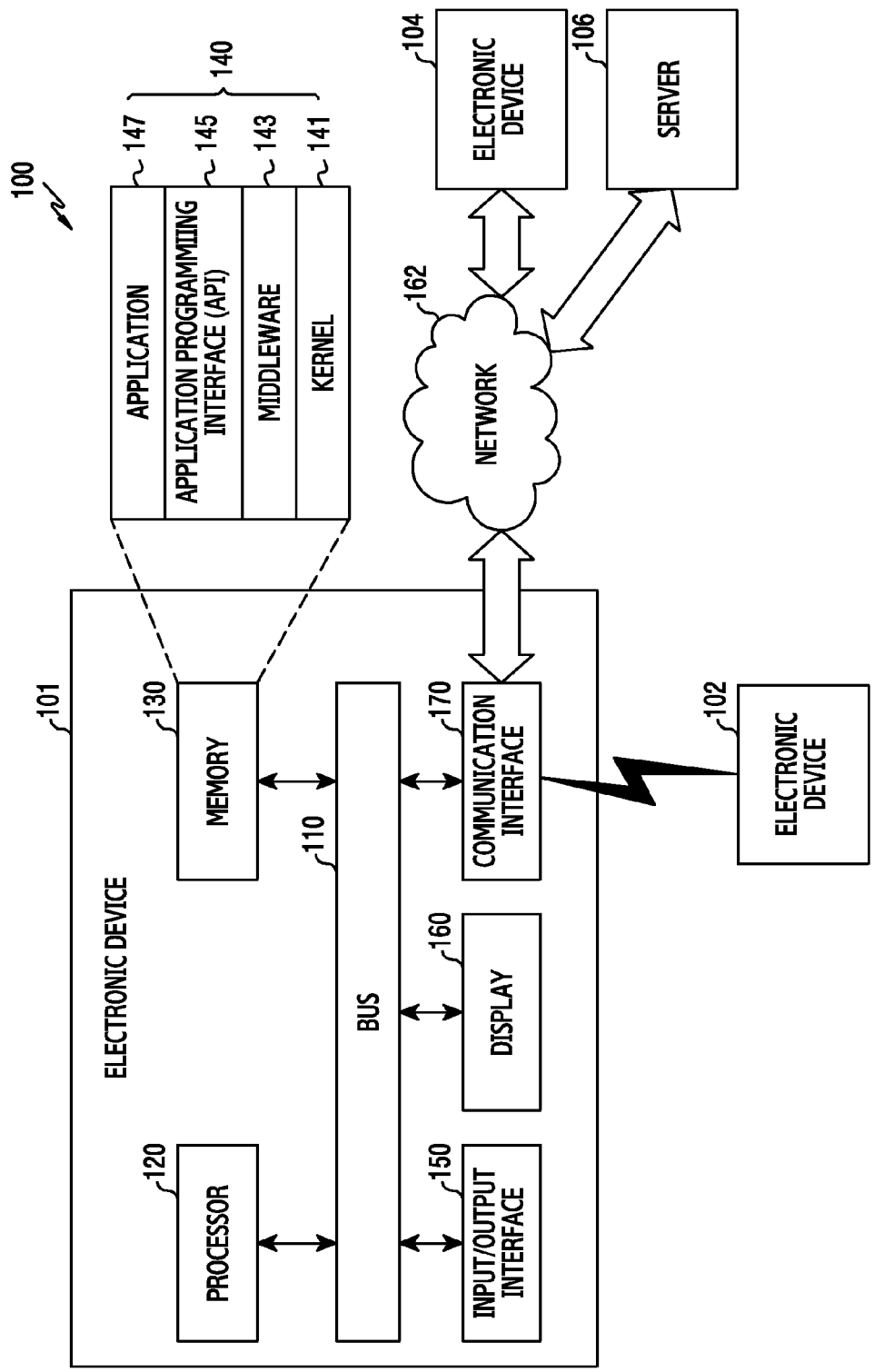
FIG. 1 illustrates a network environment of an electronic device according to embodiments of the present invention.

FIG. 1 illustrates a network environment of an electronic device according to embodiments of the present invention.

Referring to FIG. 1, the network environment 100 of the electronic device includes electronic devices 101 such as smartphones and tablet PCs, and an external electronic device 102, an external electronic device 104, and a server 106. The external electronic device 102 communicates in a short-range with the electronic device 101. The external electronic device 104 and the server 106 communicate in a long-range with the electronic device 101 through a network 162.

The electronic device 101 includes a bus 110, a processor 120, a memory 130, an input/output interface 150, a display 160, and a communication interface 170. The bus 110 includes a circuit connecting the constituent elements with one another and forwarding a communication message or data between the constituent elements.

The processor 120 includes any one or more of a Central Processing Unit (CPU), an Application Processor (AP), and a Communication Processor (CP), and executes operations or data processing regarding control or communication of at least one constituent element of the electronic device 101.

The processor 120 controls, for example, to exchange data through a communication section that is synchronized with other electronic devices constructing a proximal network and belongs to a cluster of the proximal network. Herein, the communication section is denoted as a Discovery Window (DW) in compliance with a Neighborhood Area Network (NAN) communication standard.

The memory 130 includes a volatile and/or non-volatile memory, stores an instruction or data related to at least one other constituent element of the electronic device 101, and stores software and/or programs 140.

The programs 140 includes a kernel 141, middleware 143, Application Programming Interface (API) 145, and application 147. One or more of the kernel 141, the middleware 143, and the API 145 may be denoted as an Operating System (OS).

The kernel 141 controls or manages system resources such as the bus 110, the processor 120, or the memory 130 used to execute operations or functions implemented in the other programs such as the middleware 143, the API 145, or the application program 147.

The middleware 143 performs a relay role of enabling the API 145 or the application program 147 to communicate and exchange data with the kernel 141.

The API 145, which is an interface enabling the application 147 to control a function provided by the kernel 141 or the middleware 143, includes at least one interface or function for file control, window control, picture processing, or character control.

The input/output interface 150 performs forwarding an instruction or data, which is inputted by a user or from other external electronic devices, to the other constituent elements of the electronic device 101.

The display 160 may be an LCD, Light Emitting Diode (LED) or Organic Light Emitting Diode (OLED) display, including a touch screen. The display 160 receives, for example, a touch, gesture, or proximity or hovering input from an electronic pen or a user's finger.

The communication interface 170 establishes communication between the electronic device 101 and the external electronic device 102, 104 or the server 106. For example, the communication interface 170 is connected to the network 162 through wireless communication or wired communication, and communicates with the external electronic device 104 and the server 106.

The type of wireless communication includes, for example, at least one of Long Term Evolution (LTE), LTE-Advanced (LTE-A), Code Division Multiple Access (CDMA), Wideband CDMA (WCDMA), Universal Mobile Telecommunications System (UMTS), Wireless Broadband (WiBro), and Global System for Mobile Communications (GSM). The wired communication includes, for example, at least one of a Universal Serial Bus (USB), a High Definition Multimedia Interface (HDMI), a Recommended Standard-232 (RS-232), and a Plain Old Telephone Service (POTS).

The network 162 includes, for example, at least one of a telecommunications network, a computer network (i.e., a Local Area Network (LAN) or a Wide Area Network (WAN)), the Internet, and a telephone network.

Figure 2:
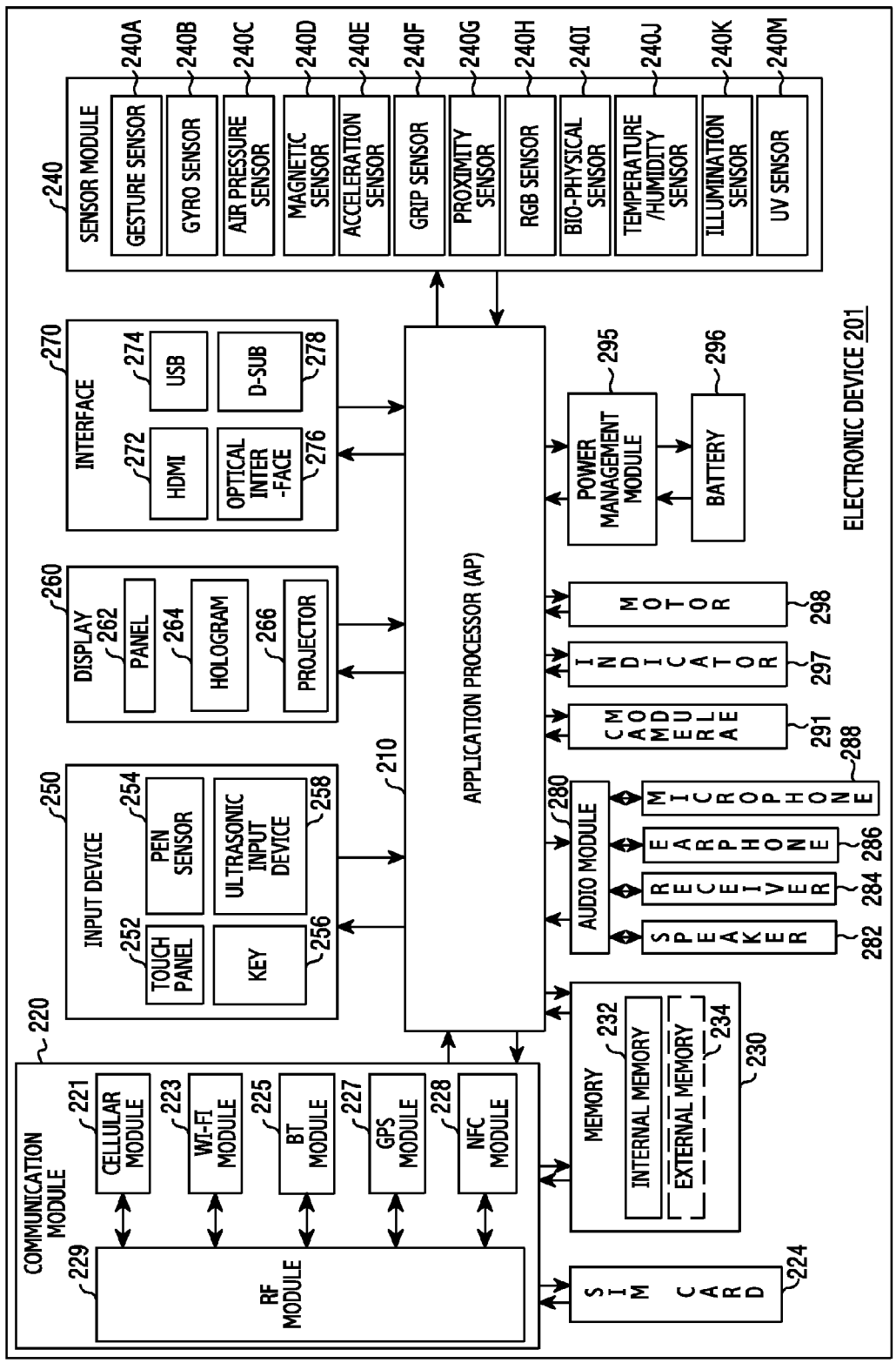
FIG. 2 is a block diagram illustrating an electronic device according to embodiments of the present invention.

FIG. 2 is a block diagram illustrating an electronic device according to embodiments of the present invention.

Referring to FIG. 2, the electronic device 201 includes one or more Application Processors (APs) 210, a communication module 220, a Subscriber Identification Module (SIM) card 224, a memory 230, a sensor module 240, an input device 250, a display 260, an interface 270, an audio module 280, a camera module 291, a power management module 295, a battery 296, an indicator 297, and a motor 298.

The AP 210 runs an operating system or an application program to control a plurality of hardware or software constituent elements connected to the AP 210, and performs processing and operation of data. The AP 210 may be implemented as a System On Chip (SoC), and may further include a Graphic Processing Unit (GPU).

The AP 210 includes at least some of the elements illustrated in FIG. 2, and loads an instruction or data received from a non-volatile memory to a volatile memory, processes the instruction or data, and stores data in the non-volatile memory.

The communication module 220 is constructed in a similar manner to the communication interface 170 of FIG. 1. The communication module 220 includes a cellular module 221, a Wi-Fi module 223, a Bluetooth® (BT) module 225, a Global Positioning System (GPS) module 227, a Near-Field Communication (NFC) module 228, and a Radio Frequency (RF) module 229.

For example, the cellular module 221 provides voice telephony, video telephony, and text and Internet service through a telecommunication network. The cellular module 221 uses a SIM card 224 to perform distinction and authorization of the electronic device 201 within the telecommunication network. The cellular module 221 performs at least some of the functions provided by the AP 210, and includes a Communication Processor (CP).

Each of the Wi-Fi module 223, the BT module 225, the GPS module 227 and the NFC module 228 each may include a processor for processing data transmitted/received through the corresponding module, and at least two of the modules of the communication module 220 may be included within one Integrated Circuit (IC) or IC package.

The RF module 229 transmits/receives an RF communication signal, and includes a transceiver, a Power Amplifier Module (PAM), a frequency filter, a Low Noise Amplifier (LNA), or an antenna. At least one of the modules of the communication module 220 may transmit/receive an RF signal through a separate RF module.

The SIM card 224 may be an embedded SIM. The SIM card 224 includes unique identification information such as an Integrated Circuit Card ID (ICCID), or subscriber information such as an International Mobile Subscriber Identity (IMSI).

The memory 230 includes an internal memory 232 and an external memory 234. The sensor module 240 measures a physical quantity or senses an activation state of the electronic device 201, to convert measured or sensed information into an electric signal.

The sensor module 240 includes at least one of a gesture sensor 240A, a gyro sensor 240B, an air pressure sensor 240C, a magnetic sensor 240D, an acceleration sensor 240E, a grip sensor 240F, a proximity sensor 240G, a color sensor 240H (e.g., a Red, Green, Blue (RGB) sensor), a biophysical sensor 240I, a temperature/humidity sensor 240J, an illumination sensor 240K, and an UltraViolet (UV) sensor 240M.

The sensor module 240 may further include an E-nose sensor, an Electromyography (EMG) sensor, an Electroencephalogram (EEG) sensor, an Electrocardiogram (ECG) sensor, an Infrared (IR) sensor, an iris sensor, and/or a fingerprint sensor.

The input device 250 includes a touch panel 252, a (digital) pen sensor 254, a key 256, and an ultrasonic input device 258. The display 260 includes a panel 262, a hologram device 264, and a projector 266.

The interface 270 includes a High-Density Multimedia Interface (HDMI) 272, a Universal Serial Bus (USB) 274, an optical interface 276, and a D-subminiature (D-sub) 278. The audio module 280 converts a voice and an electric signal interactively, and processes sound information which is inputted or outputted through a speaker 282, a receiver 284, an earphone 286, or a microphone 288.

The camera module 291, which takes still and moving pictures, includes one or more image sensors, a lens, an Image Signal Processor (ISP), and a flash such as an LED or a xenon lamp.

The power management module 295 manages electric power of the electronic device 201, and includes a Power Management Integrated Circuit (PMIC), a charger IC, and a battery gauge.

The indicator 297 displays a specific status of part or the entirety of the electronic device 201 such as a booting, message, or power state. The motor 298 converts an electric signal into a mechanical vibration, and induces the effect of vibration.

Figure 3:
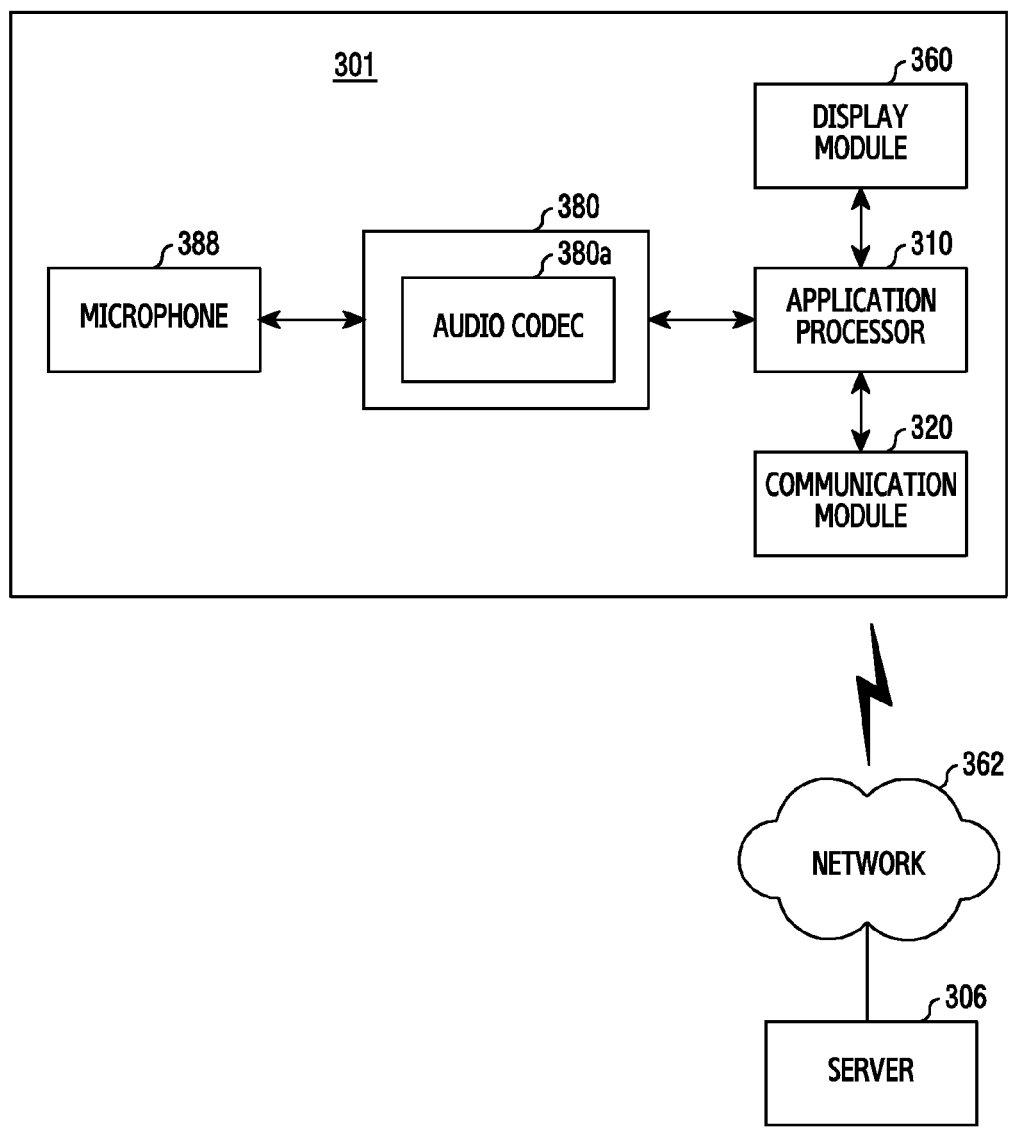
FIG. 3 illustrates a partial construction of an electronic device performing a method for voice recognition according to embodiments of the present invention.

FIG. 3 illustrates a partial construction of an electronic device performing a method for voice recognition according to embodiments of the present invention.

Referring to FIG. 3, the electronic device 301 includes an application processor 310, a communication module 320, a display module 360, an audio module 380, and a microphone 388.

The electronic device 301 may operate in various operation modes such as a normal mode or an idle mode, and may operate in a power-saving mode such as a sleep mode, for minimizing power consumption. For example, the power-saving mode may decrease an operation speed of the application processor 301. Herein, the sleep mode represents operation modes for reducing power consumption, but the present invention is not limited thereto.

Referring to FIG. 3, if the electronic device 301 enters the power-saving mode by using low power, the electronic device 301 turns Off the display module 360 that uses high power, and converts a state of the application processor 310 using a high frequency clock (e.g., a Giga Hertz (GHz) unit), into an idle state.

To recognize a voice signal inputted by a user through the microphone 388 while in the sleep mode, the electronic device 301 drives an audio codec 380a included within the audio module 380. The audio codec 380a may be referred to as a first processor using low power, and the application processor 310 may be referred to as a second processor using high power.

The audio codec 380a use a low frequency clock such as 50 Mega Hertz (MHz) of a MHz unit, and is manufactured as a low-power chip of low power consumption compared to the application processor 310.

While the application processor 310 is in the idle state, the audio codec 380a recognizes a user voice signal inputted through the microphone 388. For example, in the sleep mode, the audio codec 380a uses a 50 MHz low-frequency clock to recognize a user voice signal inputted through the microphone 388, and determines whether the user voice signal is consistent with a previously set specific voice signal.

For example, if the recognized user voice signal is a previously set specific keyword, the audio codec 380a generates a voice trigger such that a voice recognition operation is performed by at least one or more applications executed in the application processor 310.

Herein, it will be apparent to one skilled in the art that the audio codec 380a may process the user voice signal into an audio signal and output the audio signal to a speaker, as well as perform the user voice recognition operation.

After the voice trigger is generated by the audio codec 380a, the application processor 310 awakens from the idle state to an active state, and performs a voice recording operation of receiving a user voice signal inputted through the microphone 388 from the audio codec 380a and recording the user voice signal.

If the input of the user voice signal ends while the voice recording operation is performed, the application processor 310 controls an operation of the communication module 320 and interfaces with a server 306 providing a voice recognition service through a network 362. The application processor 310 may perform a voice recognition operation without interfacing with the server 306.

The application processor 310 receives a text or command corresponding to the recorded user voice signal through the interfacing with the server 306, and displays the text or performs an arbitrary function corresponding to the command.

In the sleep mode of the electronic device 301, a function of recognizing a user's voice keyword inputted through the microphone 388 and then automatically performing an arbitrary function corresponding to a seamlessly inputted user voice command, may be referred to as a "Seamless Wake-up" function.

In one embodiment, the electronic device 301 recognizes a voice trigger in a power-saving mode, records a voice input when the voice trigger is recognized, and changes into a normal mode when the recording ends.

Figure 4:
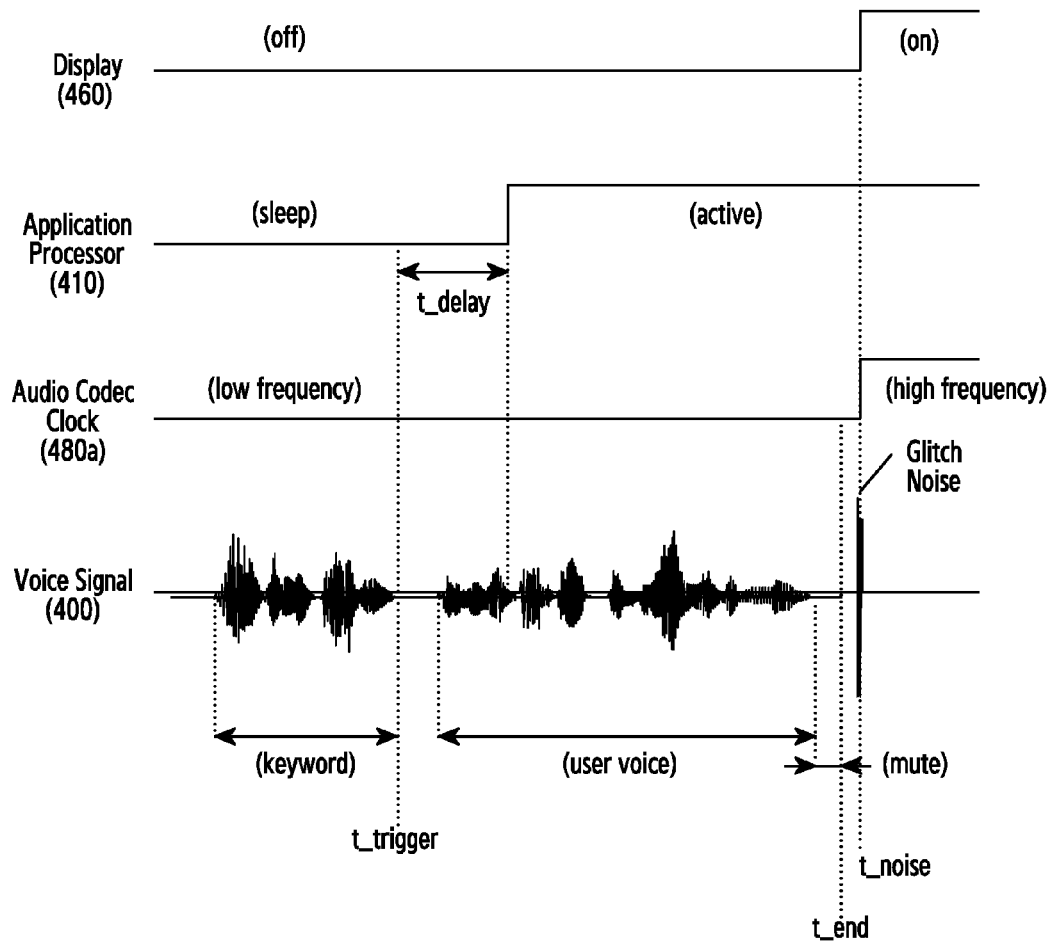
FIG. 4 illustrates an operation timing of an electronic device applying a method for voice recognition according to embodiments of the present invention.

FIG. 4 illustrates an operation timing of an electronic device applying a method for voice recognition according to embodiments of the present invention.

Referring to FIG. 4, if an electronic device such enters a sleep mode to conserve power, a display module 460 enters an Off-state, and an application processor 410 enters an idle state.

In the sleep mode, an audio codec 480a uses, for example, a 50 MHz low-frequency clock, to recognize a user voice signal 400 inputted through a microphone. If the user voice signal 400 inputted through the microphone is consistent with a previously set keyword, the audio codec 480*a* generates a voice trigger (t_trigger).

If the voice trigger is generated by the audio codec 480*a*, the application processor 410 awakens from the idle state to an active state. For example, a predetermined delay time (t_delay) such as 0.5 seconds, elapses until the application processor 410 is awakened from the idle state to the active state by the voice trigger (t_trigger).

The audio codec 480*a* buffers a user voice signal inputted through the microphone during the predetermined delay time (t_delay). If the application processor 410 becomes active, the audio codec 480*a* forwards the buffered user voice signal to the application processor 410. The audio codec 480*a* then real-time forwards a user voice signal inputted through the microphone, to the application processor 410.

After the application processor 410 becomes active, the application processor 410 records the user voice signals forwarded from the audio codec 480*a*, while monitoring whether the input of the user voice signal ends.

For example, when a mute time inputting no user voice signal is consistent with a previously-set mute time reference value of 0.5 seconds, the application processor 410 determines that a mute time point is an end time point (t_end) of input of a user voice signal.

If the end time point (t_end) of input of the user voice signal is reached, after controlling an operation of a communication module and connecting with a server through a network, the application processor 410 transmits the recorded user voice signal to the server, receives a text or command corresponding to the user voice signal from the server, and displays the received text or performs an arbitrary function corresponding to the received command.

If it is determined that the end of input of the user voice signal is reached, the application processor 410 changes the 50 MHz low frequency clock of the audio codec 480*a* into a 100 Mhz high frequency clock, thereby enabling the audio codec 480*a* to perform a normal audio signal processing operation.

If it is determined that the end of input of the user voice signal is reached, the application processor 410 releases the sleep mode of the electronic device and concurrently converts the Off-state of the display module 460 into an On state, thereby enabling the display module 460 to normally display a current operation state.

A time point at which the display module 460 is converted from the Off-state to the On state may also be a time point at which the application processor 410 detects the end of input of the user voice signal, or a time point at which the application processor 410 is awakened from the idle state to the active state.

According to embodiments of the present invention, because a time point at which the frequency clock of the audio codec 480*a* is changed from the 50 MHz low frequency clock to the 100 MHz high frequency clock is after a time point at which the application processor 410 completes the voice recording operation, as illustrated in FIG. 4, a glitch noise generated by the audio codec 480*a* is prevented from being introduced while the application processor 410 performs the voice recording operation.

FIG. 5 illustrates a mute time-setting table according to embodiments of the present invention. A mute time of a reference value to which the application processor of the electronic device refers to detect the end of input of a user voice signal may be set differently according to such factors as a specific keyword, an application associated with the specific keyword, a user utterance characteristic such as voice speed, and/or a characteristic of an inputted voice signal, such as length.

The application processor stores and manages a mute time-setting table 500 of FIG. 5, as look-up table information, and searches and refers to the look-up table information to detect the end of input of the user voice signal. The mute time-setting table 500 links and stores, in a list form, one or more keywords, an application associated with the keyword, and a mute time associated with the application.

A first keyword 510 (keyword #1) of the mute time-setting table 500 may be a specific keyword designated by a manufacturing company of the electronic device. A second keyword 520 (keyword #2) of the mute time-setting table 500 may be an arbitrary keyword designated by a user of the electronic device.

The first keyword 510 (keyword #1) may be linked to identification information, such as an application ID about applications (applications #1-1, #1-2, . . . ) used for a voice recognition operation exploiting the first keyword 510. Each of the applications is linked to a mute time of reference values being set identical to or different from one another.

The second keyword 520 (keyword #2) may be linked to identification information (e.g., an application id) about applications (applications #2-1, #2-2, . . . ) used for a voice recognition operation exploiting the second keyword 520. Each of the applications is linked to a mute time (e.g., 1.0 second, 1.2 seconds, . . . ) of reference values being set identical to or different from one another.

When the first keyword 510 is, for example, the specific keyword designated by the manufacturing company of the electronic device, after inputting the first keyword 510 it is possible for a user to input a voice signal of defined content capable of being recommended or predicted by the manufacturing company of the electronic device.

For example, because a user is highly likely to simply input a predefined voice command such as "execute a camera" after inputting the first keyword 510, the mute time of each of the reference values linked to the first keyword 510 is set to a relatively short time.

However, when the second keyword 520 is designated by the user of the electronic device, it is highly likely that the user inputs an arbitrary voice command that the user desires, after inputting the second keyword 520.

For example, because a user is highly likely to input a long and non-predefined voice command such as "instantly execute a camera function" after inputting the second keyword 520, the mute time of each of the reference values linked to the second keyword 520 is set to a relatively long time.

Accordingly, the mute time of each of the reference values linked to the first keyword 510 is shorter than the mute time of each of the reference values linked to the second keyword 520. The foregoing is an illustration of embodiments of the present invention, and the present invention is not limited thereto.

Figure 6:
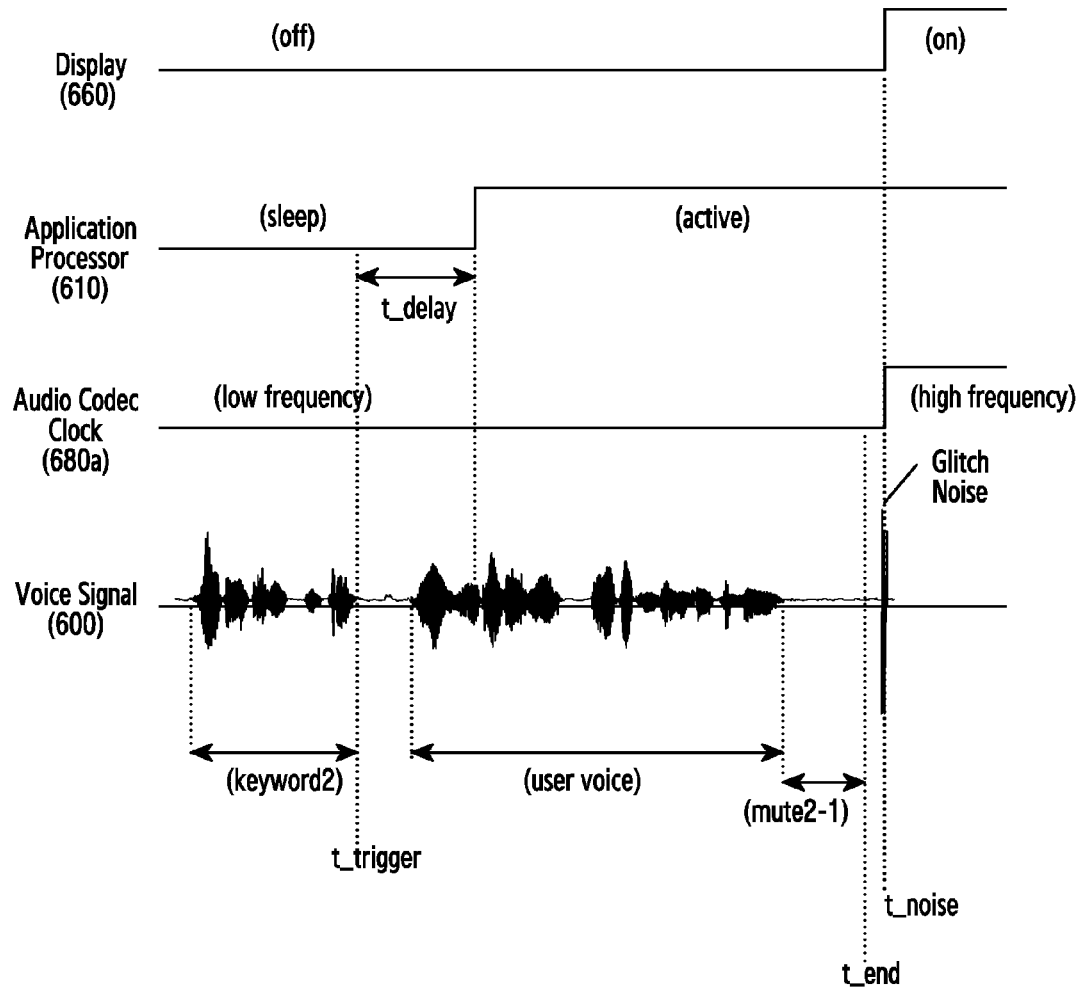
FIG. 6 illustrates another operation timing of an electronic device applying a method for voice recognition according to embodiments of the present invention.

FIG. 6 illustrates another operation timing of an electronic device applying a method for voice recognition according to embodiments of the present invention.

Referring to FIG. 6, if an electronic device enters a sleep mode to conserve power, the display module 660 enters an Off-state, and an application processor 610 enters an idle state.

In the sleep mode, an audio codec 680*a* uses, for example, a 50 MHz low-frequency clock, to recognize a user voice signal 600 inputted through a microphone. If the user voice signal 600 inputted through the microphone is consistent with a previously set keyword, the audio codec 680*a* generates a voice trigger (t_trigger).

For example, the keyword may be keyword #2 arbitrarily designated by the user of the electronic device, as described above with reference to FIG. 5. The mute time (mute 2-1) of the reference value linked to keyword #2, such as 1.0 second, is longer than the mute time (e.g., mute 1-1) of the reference value linked to the keyword #1, such as 0.5 seconds, designated by the manufacturing company of the electronic device.

If the voice trigger is generated by the audio codec 680*a*, the application processor 610 awakens from the idle state to an active state. For example, a predetermined delay time (t_delay) elapses until the application processor 610 awakened to the active state.

The audio codec 680*a* buffers a user voice signal inputted through the microphone during the predetermined delay time (t_delay). If the application processor 610 becomes active, the audio codec 680*a* high-speed forwards the buffered user voice signal to the application processor 610. The audio codec 680*a* then real-time forwards a user voice signal inputted through the microphone, to the application processor 610.

After the application processor 610 becomes active, the application processor 610 performs a voice recording operation of recording the user voice signal high-speed forwarded from the audio codec 680*a* and the user voice signal real-time forwarded from the audio codec 680*a*, while monitoring whether the input of the user voice signal ends.

For example, when a mute time inputting no user voice signal is consistent with a second mute time (mute 2-1) of a previously set reference value, the application processor 610 determines that a mute time point is an end time point (t_end) of input of a user voice signal.

If it is the end time point (t_end) of input of the user voice signal, after controlling an operation of a communication module and connecting with a server through a network, the application processor 610 transmits the recorded user voice signal to the server, receives a text or command corresponding to the user voice signal from the server, and displays the received text or performs an arbitrary function corresponding to the received command.

If it is the end of input of the user voice signal, the application processor 610 changes the 50 MHz low frequency clock of the audio codec 680*a* into the 100 MHz high frequency clock, thereby enabling the audio codec 680*a* to perform a normal audio signal processing operation.

If it is the end of input of the user voice signal, the application processor 610 releases the sleep mode of the electronic device and concurrently converts the Off-state of the display module 660 into an On-state, thereby enabling the display module 660 to normally display a current operation state.

A time point at which the display module 660 is converted from the Off-state to the On state may also be a time point at which the application processor 610 detects the end of input of the user voice signal, or a time point at which the application processor 610 is awakened from the idle state to the active state.

According to embodiments of the present invention, because a time point at which the frequency clock of the audio codec 680*a* is changed from the 50 MHz low frequency clock to the 100 MHz high frequency clock is after a time point at which the application processor 610 completes the voice recording operation, as illustrated in FIG. 6, a glitch noise generated by the audio codec 680*a* is prevented from being introduced while the application processor 610 performs the voice recording operation.

Further, the mute time of each of the reference values determining the end of input of the user voice signal are differently changed according to the keyword and/or the application associated with the keyword, enabling accurate control of a time point of release of the sleep mode.

Figure 7:
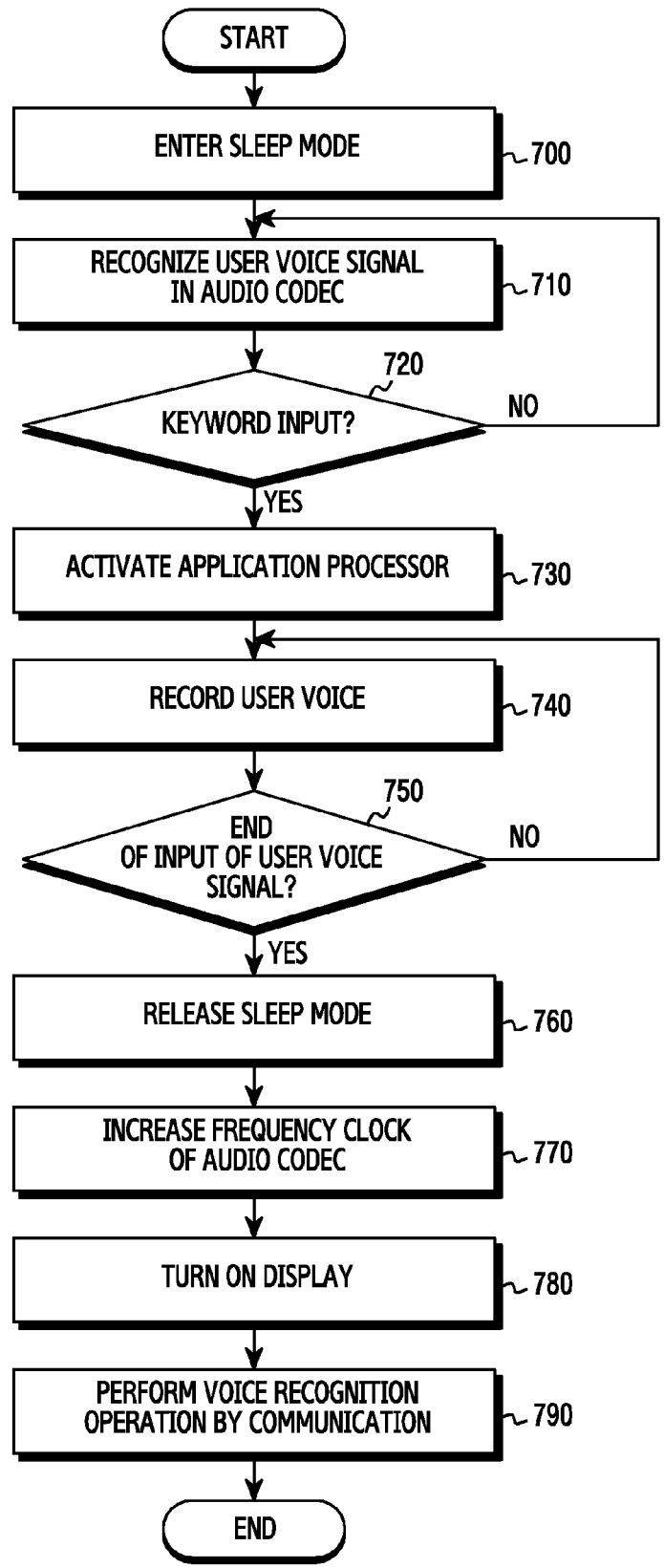
FIG. 7 is a flowchart illustrating an operation of a method for voice recognition in an electronic device according to embodiments of the present invention.

FIG. 7 is a flowchart illustrating an operation of a method for voice recognition in an electronic device according to embodiments of the present invention.

Referring to FIG. 7, in step 700, the electronic device enters a sleep mode to conserve power. If the electronic device is in the sleep mode, a display mode is turned off, and an application processor enters an idle state.

In step 710, even in the sleep mode, an audio codec of the electronic device uses a 50 MHz low-frequency clock to recognize a user voice signal inputted through a microphone, and determines whether the user voice signal is a previously set specific keyword.

If it is determined that the specific keyword is input in step 720, the application processor of the electronic device is awakened from the idle state in step 730, and enters an active state after the lapse of a predetermined delay time.

In step 740, the application processor receives a user voice signal buffered within the audio codec after the input of the specific keyword and thereafter, records the received buffered user voice signal together with a user voice signal real-time forwarded from the audio codec.

In step 750, while performing the voice recording operation, the application processor determines whether the end of input of the user voice signal is reached.

In step 760, if the end of input of the user voice signal is determined, the application processor releases the sleep mode. In step 770, the application processor increases the frequency clock of the audio codec from the 50 MHz low frequency clock to the 100 MHz high frequency clock, to enable the audio codec to perform a normal audio signal processing operation.

In step 780, the application processor converts the Off-state of the display module into an On state, to enable the display module to normally display an operation state of the electronic device.

In step 790, the application processor controls an operation of a communication module, connects with a server providing a voice recognition service through a network, and normally performs a voice recognition operation through communication with the server. Steps 760 to 790 may be performed sequentially in a different order, or may be performed concurrently.

According to embodiments of the present invention, a time point at which the frequency clock of the audio codec is increased is set to be after a time point at which the application processor completes the voice recording operation, thereby preventing a glitch noise caused by the audio codec from being introduced into voice recording. As such, the accuracy of a voice recognition operation is increased.

According to embodiments of the present invention, a method for voice recognition in an electronic device includes recognizing, in a first processor using a designated clock in a low power mode of the electronic device, a voice signal inputted through a microphone, if the recognized voice signal is a previously set keyword, entering an active state and performing voice recording in a second processor, and if the end of a voice input is determined during the voice recording, performing voice recognition in the second processor. After the end of the voice input is determined, a clock of the first processor may be changed.

The first processor may be an audio codec, the second processor may be an application processor, and the audio codec may be a low power chip using a lower frequency clock than the application processor.

The first processor buffers a voice signal inputted through a microphone during a delay time until the second processor enters an active state from a wake-up start, and if the second processor enters the active state, the first processor forwards the buffered voice signal to the second processor, and real-time forwards a voice signal inputted through the microphone after activation, to the second processor.

The second processor determines whether a voice input ends during the voice recording, based on a reference mute time that may be set differently according to the keyword or an application associated with the keyword.

The method for voice recognition in the electronic device stores, as look-up table information, mute time of a plurality of reference values differently set according to the keyword or the application associated with the keyword. The look-up table information includes at least one of a specific keyword designated by a manufacturing company of the electronic device and an arbitrary keyword designated by a user of the electronic device. The voice recognition further includes converting, if it is determined that the end of the voice input is reached, an Off-state of a display module of the electronic device into an On state.

The second processor communicates with a server through a network and receives at least one of a command or text corresponding to the recorded voice signal. The voice recognition method may further include performing a function corresponding to the received command, or displaying the received text.

According to embodiments of the present invention, an electronic device includes a microphone for receiving an input of a voice signal, a first processor for signal-processing the voice signal, and a second processor for recognizing the voice signal. The first processor uses a designated clock in a sleep mode of the electronic device, to recognize the voice signal inputted through the microphone. If the voice signal recognized by the first processor is a previously set keyword, the second processor enters an active state from an idle state and performs voice recording. If it is determined that the end of a voice input is reached during the voice recording, the second processor changes a clock of the first processor.

The second processor determines whether a voice input ends during the voice recording, based on a reference mute time set differently according to the keyword or an application associated with the keyword.

The second processor stores, as look-up table information, mute time of a plurality of reference values set differently according to the keyword or the application associated with the keyword.

The look-up table information includes at least one of a specific keyword designated by a manufacturing company of the electronic device and an arbitrary keyword designated by a user of the electronic device. If it is determined that the end of the voice input is reached, the second processor converts an Off-state of a display module of the electronic device into an On-state.

The second processor communicates with a server through a network and receives at least one of a command or text corresponding to the recorded voice signal. The second processor performs a function corresponding to the received command, or displays the received text.

According to embodiments of the present invention, types of electronic devices such as smartphones and tablet PCs may accurately recognize a user voice signal inputted through a microphone.

According to embodiments of the present invention, when an electronic device recognizes a user voice signal inputted through a microphone in a sleep mode, for example, the electronic device prevents the influence of a specific noise generated at a time point of changing a driving frequency of a first processor using low power, such as an audio codec, and thus increases the accuracy of voice recognition.

While the present invention has been shown and described with reference to certain embodiments thereof, it will be understood by those skilled in the art that changes in form and details may be made therein without departing from the spirit and scope of the present invention as defined by the appended claims.

What is claimed is:

1. A method for voice recognition in an electronic device, the method comprising:
   detecting, in a first processor operating on a first clock frequency, a previously-set keyword inputted through a microphone;
   buffering, by the first processor, a voice signal input through the microphone after the previously set keyword is input and before a state of a second processor is switched from an idle state to an active state;
   performing, by the second processor, voice recording of the voice signal using at least the buffered voice signal;
   detecting a completion of the voice recording; and
   in response to detecting the completion of the voice recording, changing a clock frequency of the first processor to a second clock frequency higher than the first clock frequency.

2. The method of claim 1, wherein the first processor is an audio codec,
   the second processor is an application processor, and
   the audio codec is a low power chip using a lower frequency clock than the application processor.

3. The method of claim 1, wherein the first processor buffers the voice signal input through the microphone for a delay time until the second processor switches to the active state from a wake-up start, and further comprising:
   when the second processor switches to the active state:
   forwarding, by the first processor, the buffered voice signal to the second processor, and then
   real-time forwarding, by the first processor to the second processor, the voice signal as it is being input through the microphone.

4. The method of claim 1, wherein detecting the completion of the voice recording comprises:
   detecting, by the second processor, the completion of the voice recording based on a reference mute time preset according to at least one of a keyword and an application.

5. The method of claim 1, further comprising:
   in response to the changing, performing, by the first processor operating on the second clock frequency, an audio signal processing.

6. The method of claim 4, wherein each keyword and/or application is associated with one or more reference mute times, and these associations are stored as look-up table information, and
   wherein the associations in the look-up table information are designated by a manufacturing company of the electronic device and/or designated by a user of the electronic device.

7. The method of claim 1, further comprising:
in response to detecting the completion of the voice recording, turning on a display module of the electronic device.

8. The method of claim 1, further comprising:
in response to detecting the completion of the voice recording, performing voice recognition on the voice signal recorded by the second processor.

9. The method of claim 8, further comprising:
transmitting the recorded voice signal to a server through a network, wherein the server performs the voice recognition on the recorded voice signal;
receiving, by the electronic device from the server, at least one of a command and a text corresponding to the recorded voice signal; and
performing, by the electronic device, a function corresponding to the received at least one of a command and a text.

10. An electronic device comprising:
a microphone;
a first processor; and
a second processor,
wherein the first processor is configured to:
  detect, while operating on a first clock frequency, a previously set keyword input through the microphone; and
  buffer a voice signal input through the microphone after the previously set keyword is input and before a state of the second processor is switched from an idle state to an active state, and
wherein the second processor is configured to:
  perform voice recording of the voice signal using at least the buffered voice signal;
  detect a completion of the voice recording; and
  in response to detecting the completion of the voice recording, control to change a clock frequency of the first processor to a second clock frequency higher than the first clock frequency.

11. The electronic device of claim 10, wherein the first processor is an audio codec,
the second processor is an application processor, and
the audio codec is a low power chip using a lower frequency clock than the application processor.

12. The electronic device of claim 10, wherein the first processor is configured to buffer the voice signal input through the microphone for a delay time until the second processor switches to the active state from a wake-up start, and
wherein, when the second processor switches to the active state, the first processor is configured to forward the buffered voice signal to the second processor, and then real-time forwards to the second processor the voice signal as it is being input through the microphone.

13. The electronic device of claim 10, wherein the second processor is configured to detect the completion of the voice recording, based on a reference mute time preset according to at least one of a keyword or an application.

14. The electronic device of claim 10, wherein the first processor is further configured to perform an audio signal processing in response to changing the clock frequency to the second clock frequency.

15. The electronic device of claim 13, wherein each keyword and/or application is associated with one or more reference mute times, and these associations are stored as look-up table information, and
wherein the associations in the look-up table information are designated by a manufacturing company of the electronic device and/or designated by a user of the electronic device.

16. The electronic device of claim 10, wherein the second processor is further configured to, in response to detecting the completion of the voice recording, control to turn on a display module of the electronic device.

17. The electronic device of claim 10, wherein the second processor is further configured to, in response to detecting the completion of the voice recording, control to perform voice recognition on the voice signal recorded by the second processor.

18. The electronic device of claim 17, wherein the second processor is further configured to:
control to transmit the recorded voice signal to a server through a network, wherein the server performs the voice recognition on the recorded voice signal;
control to receive, from the server, at least one of a command and a text corresponding to the recorded voice signal; and
control to perform a function corresponding to the received at least one of a command and a text.

19. A non-transitory computer-readable storage medium having recorded thereon a program for performing a method for voice recognition in an electronic device, the method comprising:
detecting, in a first processor operating on a first clock frequency, a previously-set keyword inputted through a microphone;
buffering, by the first processor, a voice signal input through the microphone after the previously set keyword is input and before a state of a second processor is switched from an idle state to an active state;
performing, by the second processor, voice recording of the voice signal using at least the buffered voice signal;
detecting a completion of the voice recording; and
in response to detecting the completion of the voice recording, changing a clock frequency of the first processor to a second clock frequency higher than the first clock frequency.

20. A method for voice recognition in an electronic device, the method comprising:
detecting, in a first processor operating on a first clock frequency, a first voice signal inputted through a microphone;
if the first voice signal includes a previously set keyword, recording, in a second processor, a second voice signal being input through the microphone;
detecting, in the first processor, a completion of the recording; and
in response to detecting the completion of the recording, changing a clock frequency of the first processor to a second clock frequency higher than the first clock frequency.

* * * * *